Figures 1, 2:
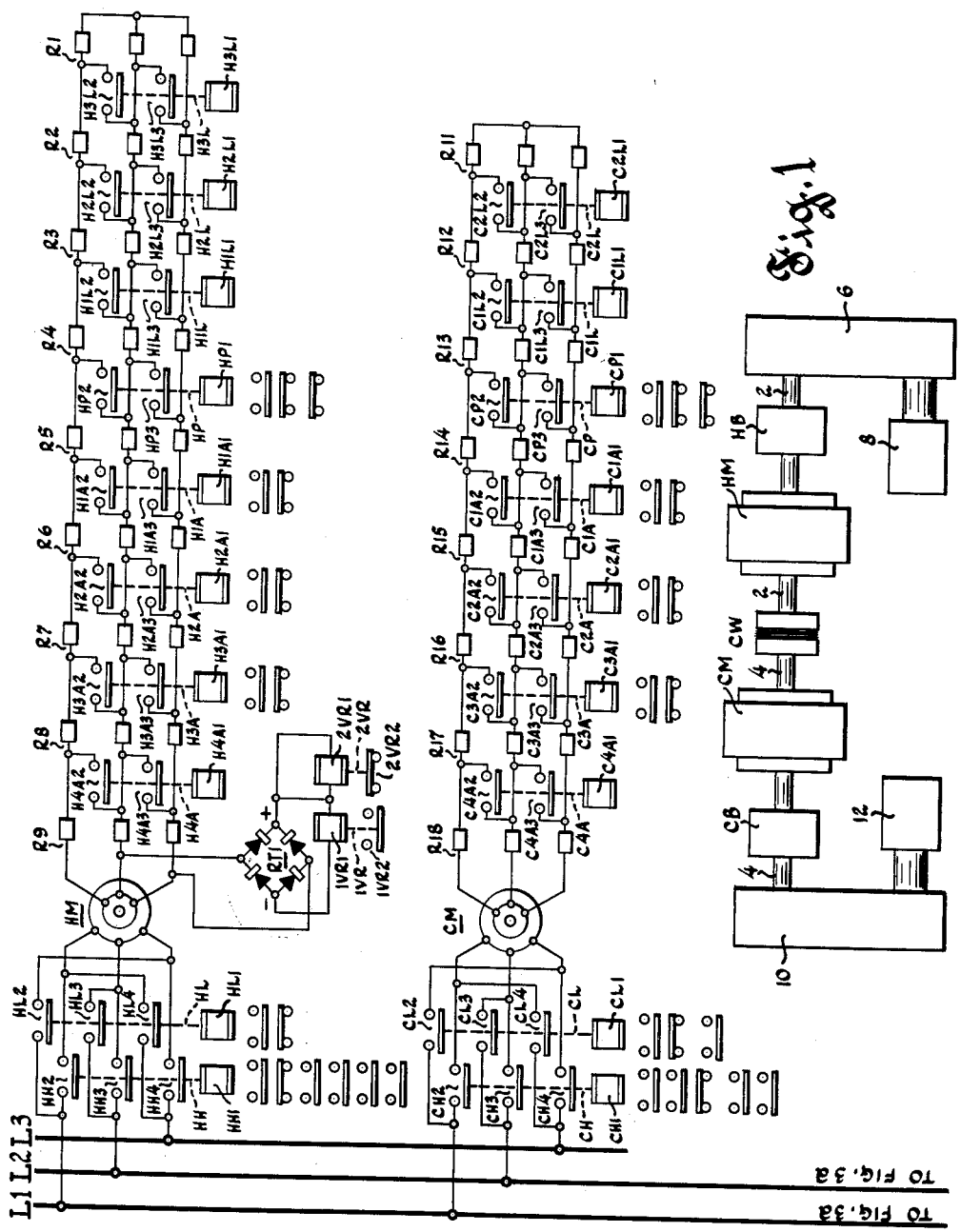

April 4, 1961 W. C. RHINE 2,978,130
MOTOR CONTROL SYSTEM
Filed Sept. 26, 1957 4 Sheets-Sheet 1

Inventor
William C. Rhine
By H R Rather
Attorney

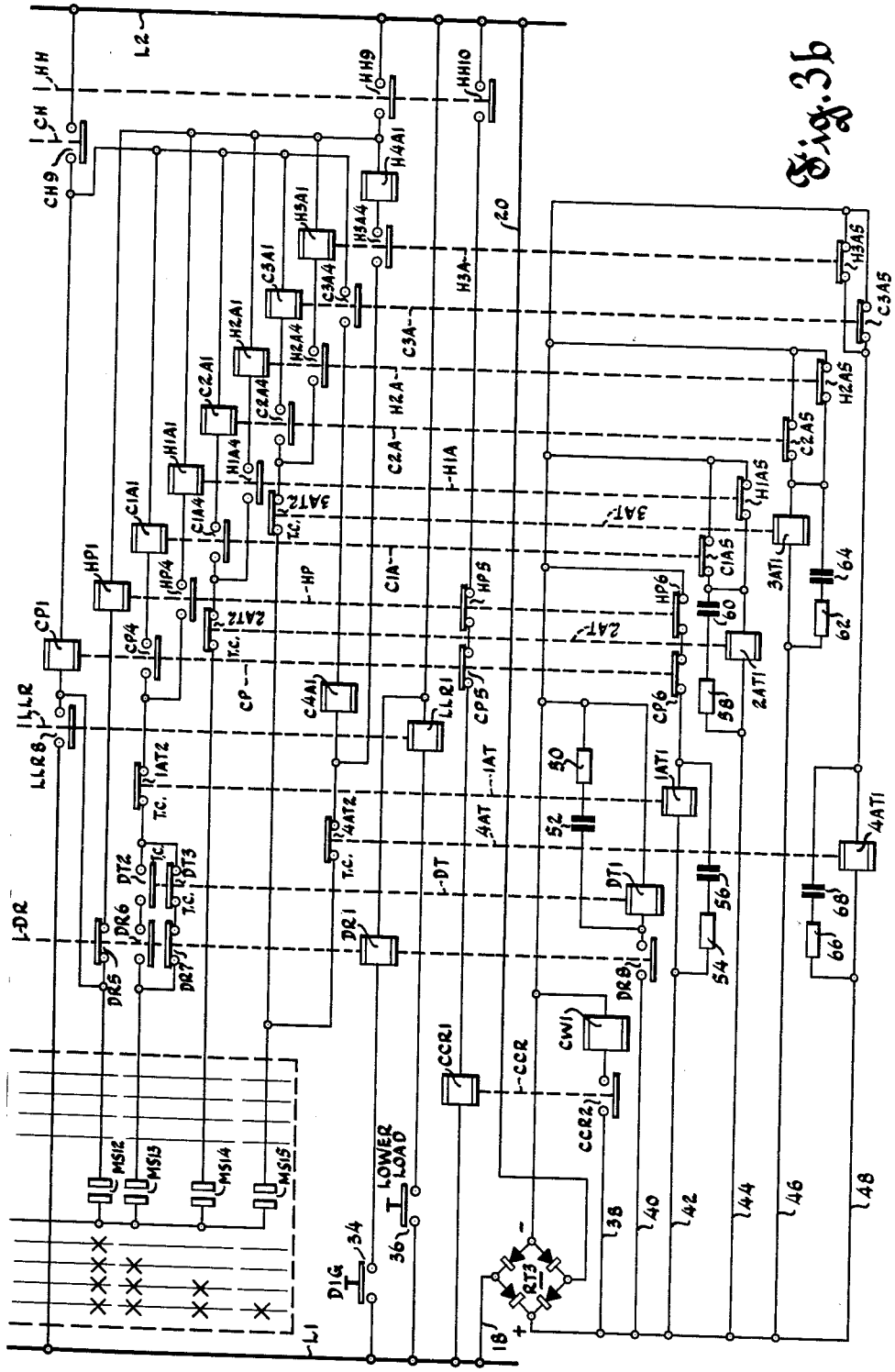

April 4, 1961 W. C. RHINE 2,978,130
MOTOR CONTROL SYSTEM
Filed Sept. 26, 1957 4 Sheets-Sheet 4
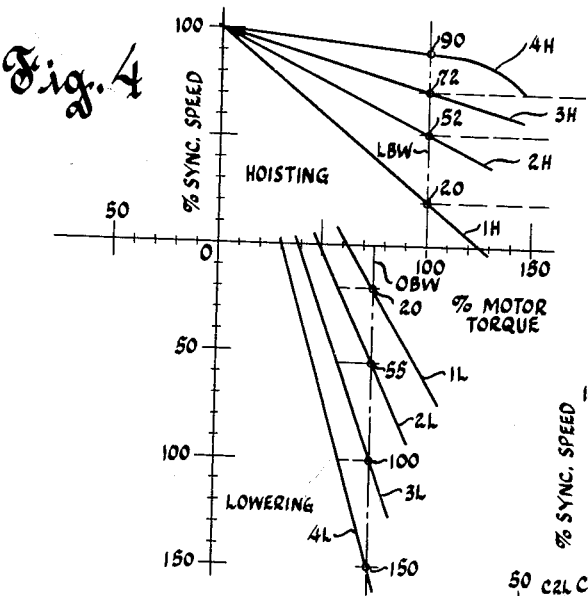
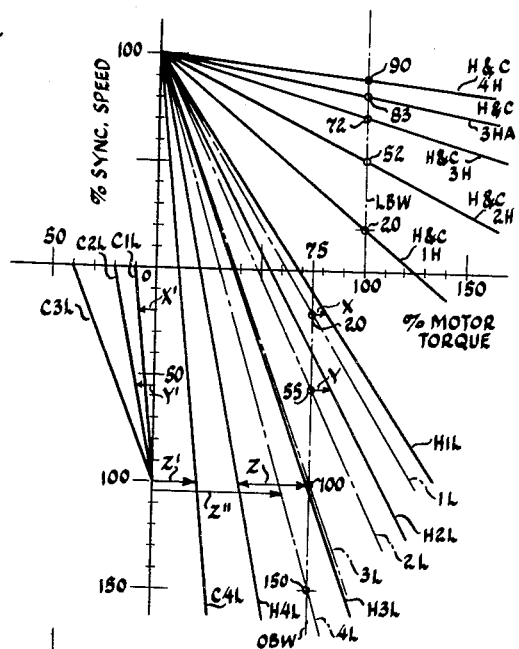
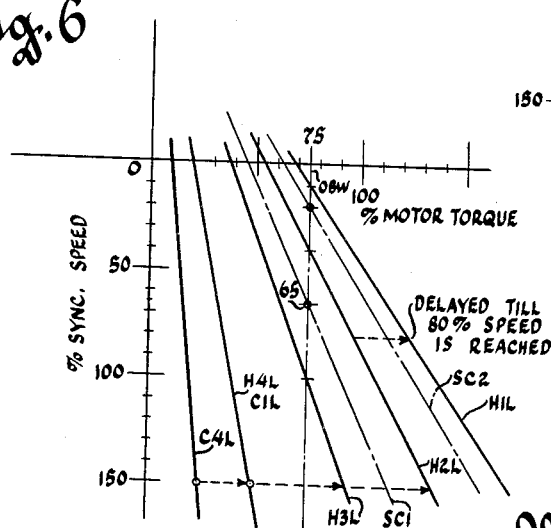
Inventor
William C. Rhine
By H. P. Rather
Attorney

United States Patent Office 2,978,130
Patented Apr. 4, 1961

2,978,130

MOTOR CONTROL SYSTEM

William C. Rhine, Menomonee Falls, Wis., assignor to Cutler-Hammer, Inc., Milwaukee, Wis., a corporation of Delaware Filed Sept. 26, 1957, Ser. No. 686,482

14 Claims. (Cl. 214—656)

This invention relates to improvements in motor control systems.

While not limited thereto, the invention is especially applicable to controllers for two-motor bucket hoists employed in unloading towers and the like.

It has been found desirable to provide an improved electrical motor control system employing a single master control for operating both the holding and closing motors and a clutch. It is also desirable to increase the bucket speed over that of prior systems.

Accordingly, an object of the invention is to provide improved means affording the aforementioned and other improved results.

A specific object of the invention is to provide an improved control system for automatically affording improved matched speed operation of a plurality of electrical motors.

A more specific object of the invention is to provide improved control means for controlling clutching means between such motors to improve the operation of the latter.

Another specific object of the invention is to provide an improved control system for automatically affording matched speed operation of a plurality of electrical motors throughout all lowering speed points of a hoisting machine.

Another object of the invention is to provide improved selectively controllable means affording hoist motor lowering speeds substantially above the synchronous speed thereof.

A further object of the invention is to provide an improved bucket hoist control system which is simple in construction while affording all required operations with minimum manipulation by the operator.

Other objects and advantages of the invention will hereinafter appear.

While the apparatus hereinafter described is effectively adapted to fulfill the objects stated, it is to be understood that I do not intend to confine my invention to the particular preferred embodiment of motor control system disclosed, inasmuch as it is susceptible of various modifications without departing from the scope of the appended claims.

Figure 3A:
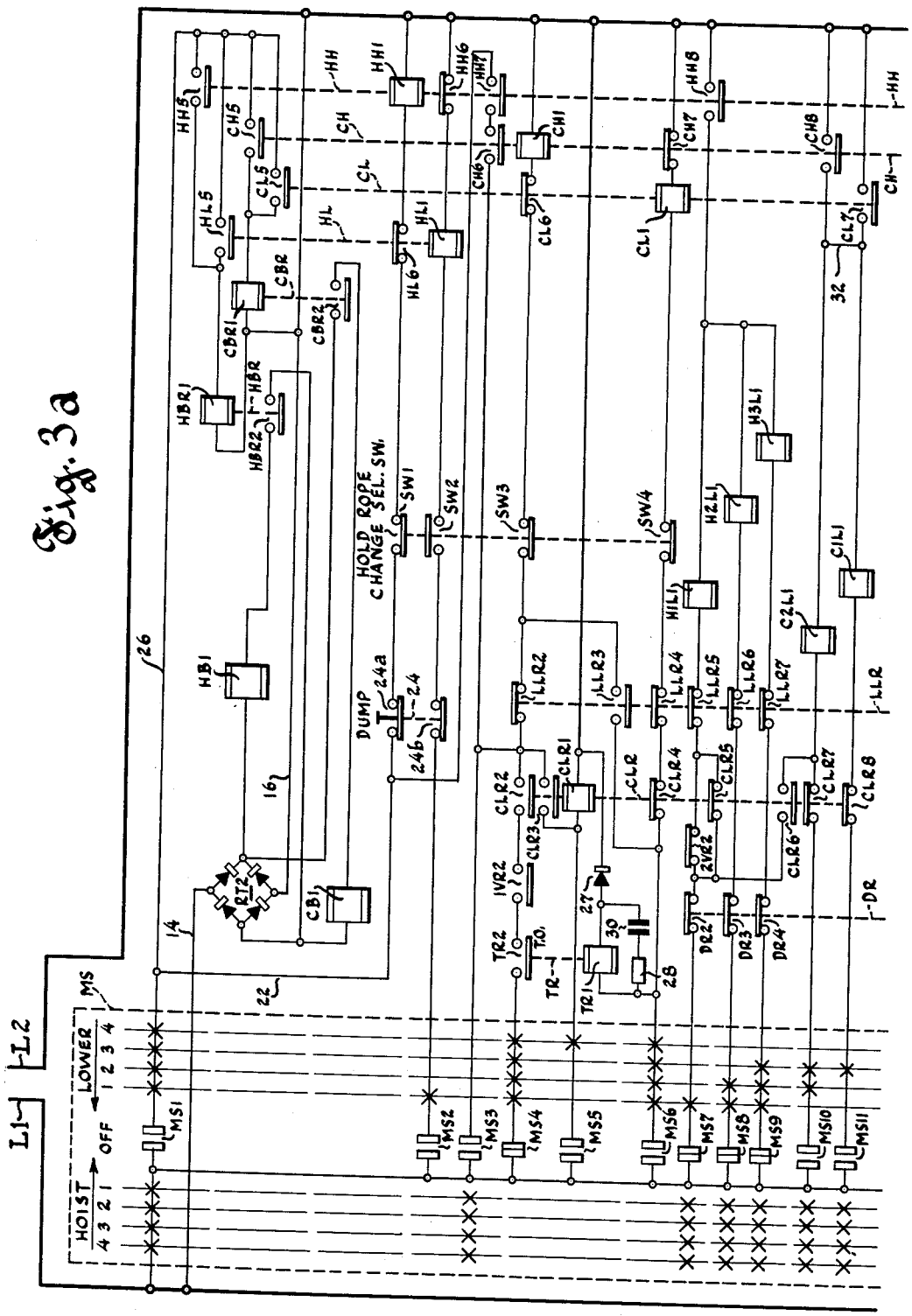

In the drawings:

Fig. 1 is a schematic illustration of a motor-drive mechanism constructed in accordance with the present invention;

Fig. 2 diagrammatically shows power circuits and speed control networks for the motors of Fig. 1;

Figs. 3A and 3B diagrammatically show a master control system operable in conjunction with Fig. 2 for controlling the mechanism of Fig. 1;

Fig. 4 graphically illustrates bucket speed characteristics of the invention;

Fig. 5 is a graph showing speed-torque curves for the motors of Fig. 1; and

Fig. 6 graphically depicts bucket speed-checking characteristics when lowering an open bucket.

The motor-drive mechanism shown in Fig. 1 is employed to operate the holding and closing lines of a two-motor bucket hoist for unloading towers. A hold motor HM and a close motor CM are connected through their driven shafts 2 and 4, respectively, to opposite sides of a normally disengaged clutch CW preferably of the electromagnetic type. Hold motor HM is further connected through shaft 2 to a brake HB and a gear box 6 and through the latter to a drum 8 for winding and unwinding the holding lines. Similarly, close motor CM is connected through shaft 4 to a brake CB and a gear box 10 and through the latter to a drum 12 for winding and unwinding the closing lines. Hold motor brake HB and close motor brake CB are preferably of the spring-applied type having an electro-responsive winding for disengaging the same as hereinafter more fully described.

As shown in Fig. 2, hold motor HM and close motor CM, preferably of the three-phase slip-ring type, are connectable in parallel to power supply lines L1, L2 and L3, the latter being connectable through the usual on-off switches to a three-phase power supply source (not shown).

The stator or primary winding of motor HM is connectable to supply lines L1–3 for forward or reverse energization through normally open contacts HH2–4 or normally open contacts HL2–4 of a hoisting contactor HH and a lowering contactor HL, respectively. Contactor HH further comprises an operating coil HH1 and contacts HH5–10 also shown in Figs. 3A–B, while contactor HL has an operating coil HL1 and additional contacts HL5–6 also shown in Fig. 3A.

The rotor or secondary winding of motor HM is connected to a resistance network having nine groups of resistors R1–9, each such group comprising three resistors in series connection, respectively, with corresponding resistors of the other groups in the three phases of the rotor winding. Commutating contactors H3L, H2L, H1L, HP, H1A, H2A, H3A and H4A having pairs of normally open contacts H3L2–3, H2L2–3, H1L2–3, HP2–3, H1A2–3, H2A2–3, H3A2–3, and H4A2–3 are provided for effectively shunting resistor groups R1–8, respectively, out of circuit as hereinafter described. The aforesaid commutating contactors are provided with operating coils H3L1, H2L1, H1L1, HP1, H1A1, H2A1, H3A1 and H4A1, respectively, while contactor HP is additionally provided with contacts HP4–6, contactor H1A with contacts H1A4–5, contactor H2A with contacts H2A4–5 and contactor H3A with contacts H3A4–5, also shown in Fig. 3B.

A full-wave rectifier bridge RT1 for supplying voltage relays 1VR and 2VR is connected at its input terminals to the junctions of the rotor winding and resistor group R9 for energization by one phase of the motor secondary voltage, operating coils 1VR1 and 2VR1 of the voltage relays being connected in parallel to the positive and negative output terminals of the rectifier bridge. Relay 1VR is provided with normally-open contacts 1VR2 while relay 2VR is provided with normally-closed contacts 2VR2, also shown in Fig. 3A, for operation as hereinafter described.

The stator winding of motor CM is connectable to supply lines L1–3 for forward or reverse energization through normally open contacts CH2–4 or normally open contacts CL2–4 of a hoisting contactor CH and a lowering contactor CL, respectively. Contactor CH further comprises an operating coil CH1 and contacts CH5–9 also shown in Figs. 3A–B, while contactor CL has an operating coil CL1 and additional contacts CL5–7 also shown in Fig. 3A.

The rotor winding of motor CM is connected to a resistance network having eight groups of resistors R11–

18, each such group comprising three resistors in series connection, respectively, with corresponding resistors of the other groups in the three phases of the rotor winding. Commutating contactors C2L, C1L, CP, C1A, C2A, C3A and C4A having pairs of normally open contacts C2L2–3, C1L2–3, CP2–3, C1A2–3, C2A2–3, C3A2–3 and C4A2–3 are provided for effectively shunting resistor groups R11–17, respectively, out of circuit as hereinafter described. The aforesaid commutating contactors are provided with operating coils C2L1, C1L1, CP1, C1A1, C2A1, C3A1, and C4A1, respectively, while contactor CP is additionally provided with contacts CP4–6, contactor C1A with contacts C1A4–5, contactor C2A with contacts C2A4–5 and contactor C3A with contacts C3A4–5, also shown in Fig. 3B, for operation as hereinafter described.

The master control system shown in Figs. 3A–B is connectable at its upper portion through lines L1–2 for energization from the aforementioned power supply source. Lines L1–2 of Fig. 3A may be connected to the lower ends of lines L1–2 of Fig. 2. The master control system comprises a master switch MS, preferably of the manually operated drum type, shown in layout development at the left-hand portion of Figs. 3A–B. Switch MS is provided with fifteen contacts MS1–15, contacts MS1–3, MS5–6 and MS10–15 being normally open and contacts MS4 and MS7–9 being normally closed when the switch is in its center Off position. Switch MS is further provided with four Hoist operating positions and four Lower operating positions, the switch being successively operable through the Hoist positions by rotation of the drum in the direction of the left-hand arrow shown at the upper portion thereof and being successively operable through the Lower positions by rotation of the drum in the opposite direction as indicated by the right-hand arrow. In each of the operating positions of master switch MS, the closed condition of contacts MS1–15 is indicated by an "X" in horizontal alignment with the respective contacts while absence of an "X" indicates an open condition of the respective contacts.

A full-wave rectifier bridge RT2 at the upper portion of Fig. 3A is connected at its input terminals for energization across lines L1–2 through conductors 14 and 16, while another full-wave rectifier bridge RT3 at the lower portion of Fig. 3B is connected at its input terminals through conductors 18 and 20 to lines L1–2, respectively. Although two rectifier bridges have been shown for ease of illustration, it will be apparent that a single bridge or a separate D.C. source could be employed in place thereof.

Operating coil HH1 of hold motor hoisting contactor HH is connected across lines L1–2 through contacts MS1, conductor 22, normally closed contacts 24a of Dump switch 24, normally closed contacts SW1 of a hold-rope-change selector switch SW and normally closed interlocking contacts HL6 of hold motor lowering contactor HL. A hold motor brake relay HBR is provided having an operating coil HBR1 connected for energization through contacts MS1 and then in parallel with contactor HH through conductor 26, normally open contacts HH5 and HL5 in parallel, and conductor 16. A close motor brake relay CBR is provided having an operating coil CBR1 likewise connected for energization through contacts MS1 and then in parallel with contactor HH through conductor 26, normally open contacts CH5 and CL5 in parallel, and conductor 16.

Winding HB1 of hold motor brake HB and winding CB1 of close motor brake CB are connected through normally open contacts HBR2 and CBR2, respectively, for energization across the positive and negative output terminals of rectifier bridge RT2.

Operating coil HL1 of the aforementioned contactor HL is connected across lines L1–2 through normally closed interlocking contacts HH6, normally open contacts SW2, normally closed contacts 24b of Dump switch 24 and contacts MS2. Operating coil CH1 of the aforementioned contactor CH is connected across lines L1–2 in a circuit extending through normally closed interlocking contacts CL6 and normally closed contacts SW3 where it divides. One branch extends through normally closed contacts LLR2 of a load lowering relay LLR and then in a first circuit through contacts MS3 to line L1, and a second circuit through normally open contacts CLR2, 1VR2 and TR2 of relays CLR, 1VR and TR, respectively, and contacts MS4 to line L1; while the other branch extends through normally open contacts LLR3 and MS6 to line L1. A holding circuit for operating coil HH1 is provided from the junction of contacts CLR2 and LLR2 to the junction of conductor 22 and contacts 24a through normally open contacts CH6 and HH7. Relay CLR has an operating coil CLR1 connected through contacts MS5 across lines L1–2 and normally open contacts CLR3 for establishing a holding circuit for its operating coil from the junction of the latter and contacts MS5 to the junction of contacts CLR2 and LLR2. Operating coil CL1 of the aforementioned contactor CL is connected across lines L1–2 through normally closed interlocking contacts CH7 and normally closed contacts SW4, LLR4, CLR4 and MS6. Operating coil TR1 of the aforementioned timing relay TR is connected across lines L1–2 through contacts MS6 and a half-wave rectifier 27. Coil TR1 is shunted by series connected resistor 28 and capacitor 30 to retard deenergization thereof as hereinafter described.

Hold motor secondary resistance commutating contactors H1L, H2L and H3L have their respective operating coils H1L1, H2L1 and H3L1 connected across lines L1–2 in a circuit extending from line L2 through normally open contacts HH8 where it divides. One branch extends through coil H1L1, normally closed contacts LLR5, 2VR2 and CLR5 in parallel, DR2 and MS7 to line L1; another branch extends through coil H2L1 and normally closed contacts LLR6, DR3 and MS8 to line L1; while a third branch extends through coil H3L1 and normally closed contacts LLR7, DR4 and MS9 to line L1.

Close motor secondary resistance commutating contactors C1L and C2L have their respective operating coils C1L1 and C2L1 connected across lines L1–2 in a circuit extending from line L2 through normally open contacts CH8 and CL7 in parallel to a common connection 32 where it divides. One branch extends through coil C2L1, normally closed contacts CLR7 and contacts MS10 to line L1 while the other branch extends through coil C1L1, normally closed contacts CLR8 and contacts MS11 to line L1. Another circuit for coil C2L1 extends from line L1 through contacts MS7 and DR2 and normally open contacts CLR6.

The remaining close motor secondary resistance commutating contactors CP, C1A, C2A, C3A and C4A have their operating coils connected for energization across lines L1–2 in a five branch circuit extending from line L2 through normally open contacts CH9 where it divides. One branch extends through operating coil CP1 and then by way of parallel connections through normally open contacts LLR8 to line L1 and through contacts MS12 to line L1. A second branch extends through operating coil C1A1, normally open contacts CP4, normally closed contacts 1AT2 of an accelerating timer relay 1AT, normally open contacts DT2 and DR6 in parallel with normally closed contacts DT3 and DR7 of timer relay DT and DIG relay DR, respectively, and contacts MS13 to line L1. A third branch extends through operating coil C2A1, normally open contacts C1A4, normally closed contacts 2AT2 of an accelerating timer relay 2AT and contacts MS14 to line L1. A fourth branch extends through operating coil C3A1, normally open contacts C2A4, normally closed contacts 3AT2 of an accelerating timer relay 3AT and contacts MS15 to line L1.

And a fifth branch extends through normally open contacts C3A4, operating coil C4A1, normally closed contacts 4AT2 of an accelerating timer relay 4AT and contacts MS15 to line L1.

The remaining hold motor secondary resistance commutating contactors HP, H1A, H2A, H3A and H4A have their operating coils connected for energization across lines L1-2 in a five branch circuit extending from line L2 through normally open contacts HH9 where it divides. One branch extends through operating coil HP1, normally closed contacts DR5 and contacts MS12 to line L1. A second branch extends through operating coil H1A1 and normally open contacts HP4 to the junction of the aforementioned contacts CP4 and 1AT2 in the energizing circuit of coil C1A1. A third branch extends through operating coil H2A1 and normally open contacts H1A4 to the junction of the aforementioned contacts C1A4 and 2AT2 in the energizing circuit of coil C2A1. A fourth branch extends through operating coil H3A1 and normally open contacts H2A4 to the junction of the aforementioned contacts C2A4 and 3AT2 in the energizing circuit of coil C3A1. And a fifth branch extends through operating coil H4A1 and normally open contacts H3A4 to the junction of the aforementioned coil C4A1 and contacts 4AT2.

Operating coil DR1 of DIG relay DR is connected across lines L1-2 through a normally open pushbutton foot switch 34. Operating coil LLR1 of the aforementioned load lowering relay LLR is connected across lines L1-2 through a normally open pushbutton Lower Load switch 36. A clutch control relay CCR is provided for controlling clutch winding CW1 of clutch CW (Fig. 1) and has an operating coil CCR1 connected across lines L1-2 through normally closed contacts CP5 and HP5 and normally open contacts HH10.

The aforementioned clutch winding CW1, timer relay DT and accelerating timer relays 1AT, 2AT, 3AT and 4AT are connected in parallel for energization across the positive and negative output terminals of the aforementioned rectifier bridge RT3. More specifically, winding CW1 is connected through conductor 38 and normally open contacts CCR2 across bridge RT3. Operating coil DT1 is connected through conductor 40 and normally open contacts DR8; operating coil 1AT1 is connected through conductor 42 and normally closed contacts CP6 and HP6; operating coil 2AT1 of relay 2AT is connected through conductor 44 and parallel connected, normally closed contacts C1A5 and H1A5; operating coil 3AT1 of relay 3AT is connected through conductor 46 and parallel connected, normally closed contacts C2A5 and H2A5; and operating coil 4AT1 of relay 4AT is connected through conductor 48 and parallel connected, normally closed contacts C3A5 and H3A5 across the output terminals of rectifier bridge RT3.

Operating coil DT1 of timer relay DT is shunted by series connected resistor 50 and capacitor 52 to render contacts DT3 timed closing, as indicated by "T.C." adjacent the latter, when coil DT1 is deenergized. Contacts DT2 are instantaneous closing upon energization of operating coil DT1 as indicated by "I.C." adjacent the contacts. Similarly, contacts 1AT2, 2AT2, 3AT2 and 4AT2 of accelerating timer relays 1AT, 2AT, 3AT and 4AT, respectively, are rendered timed closing by series connected resistor 54 and capacitor 56 shunting operating coil 1AT1, series connected resistor 58 and capacitor 60 shunting operating coil 2AT1, series connected resistor 62 and capacitor 64 shunting operating coil 3AT1, and series connected resistor 66 and capacitor 68 shunting operating coil 4AT1, when the corresponding operating coils are deenergized.

Let it be assumed that power is supplied to lines L1-3 of Fig. 2 and through lines L1 and L2 to the master control system of Figs. 3A and 3B. Let it also be assumed that master switch MS is in its central Off position. Rectifier bridges RT2 and RT3 are energized across lines L1-2 through conductors 14, 16 and 18, 20, respectively. Timing relays 1AT, 2AT, 3AT and 4AT are energized in parallel across the positive and negative output terminals of bridge RT3 in a first branch extending through conductor 42, operating coil 1AT1 and contacts CP6 and HP6; in a second branch extending through conductor 44, operating coil 2AT1 and then through contacts C1A5 and H1A5 in parallel; in a third branch extending through conductor 46, operating coil 3AT1 and then through contacts C2A5 and H2A5 in parallel, and in a fourth branch extending through conductor 48, operating coil 4AT1 and then through contacts H3A5 and C3A5 in parallel. Capacitors 56, 60, 64 and 68 charge in parallel with the aforesaid operating coils, respectively. Relays 1AT, 2AT, 3AT and 4AT open respective timed closing contacts 1AT2, 2AT2, 3AT2 and 4AT2 in the energizing circuits of the hold and close motor accelerating contactors to afford timed acceleration as hereinafter described.

Let it further be assumed that the aforementioned bucket is open and in a raised position and that it is desired to lower the open bucket preparatory to digging. This is accomplished by operating master switch MS through Lower operating positions 1, 2, 3 and 4 to accelerate the bucket and back to the Off position to stop the latter.

The graph in Fig. 4, wherein bucket speeds in terms of percent motor synchronous speed are plotted against torque per motor in terms of percent motor torque, depicts in the upper portion thereof bucket speeds attained at speed points 1 through 4 (corresponding to Hoist operating positions 1-4 of master switch MS) when hoisting a loaded bucket with both the holding and closing lines. The curves in the lower portion of Fig. 4 depict bucket speeds at speed points 1 through 4 (corresponding to Lower operating positions 1-4 of master switch MS) when lowering an open bucket with both lines as hereinafter more fully described. Vertical line LBW upstanding at the 100 percent motor torque point indicates the constant motor load or loaded bucket weight in the hoisting direction in terms of percent motor torque (per motor), while vertical line OBW depending from the approximately 75 percent motor torque point indicates the constant motor load or open bucket weight in the lowering direction in like terms. The horizontal distance between lines LBW and OBW is accounted for by losses such as friction in the gearing.

As hereinafter more fully described in connection with Figs. 2, 3A and 3B, when the master control system is set at speed point 1 for hoisting, the loaded bucket accelerates from zero speed along and as depicted by curve 1H, Fig. 4 to a stable speed at approximately 20 percent motor synchronous speed whereat bucket speed curve 1H intersects the loaded bucket weight line LBW. At this point the hoisting torque is equal to the load. Operation of the master control system to speed point 2 results in an increase in hoisting torque effecting further acceleration of the bucket as depicted by curve 2H to approximately 52 percent speed whereat bucket speed curve 2H intersects line LBW. Similarly, operation of the master control system to speed points 3 and 4 results in acceleration of the bucket as depicted by curves 3H and 4H, respectively, to attain a final bucket speed of approximately 90 percent motor synchronous speed.

When the master control system is set at speed point 1 for lowering, the open bucket accelerates along curve 1L to a stable speed at approximately 20 percent motor synchronous speed whereat curve 1L intersects the open bucket weight line OBW. Similarly, operation of the master control system to speed points 2 and 3 results in acceleration of the bucket as depicted by curves 2L and 3L, respectively, to attain a resultant bucket speed of 100 percent motor synchronous speed. An essential feature of the invention resides in improved apparatus hereinafter more fully described effective in speed point 4 for accelerating the open bucket up to and above 150 percent motor synchronous speed as depicted by curve 4L.

Operation of master switch MS to Lower operating position 1 results in closure of contacts MS1, MS2 and MS6 while contacts MS4 and MS7–9 remain closed. Closure of contacts MS1 completes an energizing circuit for operating coil HH1 of hold motor hoisting contactor HH across lines L1–2 through conductor 22 and contacts 24a, SW1 and HL6. Closure of contacts MS2 of the master switch is without effect at this time while contacts MS6 complete energizing circuits across lines L1–2 for operating coil CL1 of close motor lowering contactor CL through contacts CLR4, LLR4, SW4 and CH7 and for operating coil TR1 of timing relay TR through rectifier 27. Contactor HH closes contacts HH2–4 to complete power connections to the primary winding of hold motor HM thereby to energize the latter in the hoisting direction. Contactor HH also closes contacts HH5 to complete an energizing circuit for operating coil HBR1 of hold motor brake relay HBR across lines L1–2 through contacts MS1 and conductors 26 and 16. Relay HBR closes contacts HBR2 to complete an energizing circuit for hold motor brake winding HB1 across the positive and negative output terminals of rectifier bridge RT2. As a result brake HB is disengaged to permit operation of the hold motor as hereinafter described. Contactor HH opens interlocking contacts HH6 to prevent concurrent energization of hold motor lowering contactor HL and closes contacts HH7–10. Contacts HH7 prepare a holding circuit for contactor HH while contacts HH8 complete three parallel circuits across lines L1–2 for energizing operating coil H1L1 in a first branch extending through contacts LLR5, contacts 2VR2 and CLR5 in parallel and contacts DR2 and MS7, for energizing operating coil H2L1 in a second branch extending through contacts LLR6, DR3 and MS8 and for energizing operating coil H3L1 in a third branch extending through contacts LLR7, DR4 and MS9. Contactors H3L, H2L and H1L close their respective pairs of contacts H3L2–3, H2L2–3 and H1L2–3 to shunt resistor groups R1–3 effectively out of the secondary resistance network of hold motor HM. As a result hold motor HM develops a predetermined value of torque in the hoisting direction as hereinafter more fully described in connection with Fig. 5. Contacts HH9 perform no useful function at this time while contacts HH10 complete an energizing circuit for operating coil CCR1 of clutch control relay CCR across lines L1–2 through contacts CP5 and HP5. Relay CCR energizes and closes contacts CCR2 to complete an energizing circuit for winding CW1 of clutch CW (Fig. 1) across the positive and negative output terminals of rectifier bridge RT3 through conductor 38. As a result clutch CW engages to couple the hold and close motors through shafts 2 and 4 for operation in unison.

The aforementioned energization of close motor lowering contactor CL results in closure of contacts CL2–4 (Fig. 2) to complete power connections to the primary winding of close motor CM thereby to energize the latter in the lowering direction. Contactor CL also closes contacts CL5 to complete an energizing circuit for operating coil CBR1 of close motor brake relay CBR in parallel with series connected coil HBR1 and contacts HH5. Relay CBR closes contacts CBR2 to complete an energizing circuit for close motor brake winding CB1 across rectifier bridge RT2. Energization of winding CB1 disengages close motor brake CB (Fig. 1) to permit operation of the close motor in the lowering direction. Contactor CL opens interlocking contacts CL6 to prevent concurrent energization of the close motor hoisting contactor CH, and closes contacts CL7 to prepare parallel energizing circuits for operating coils C2L1 and C1L1 of close motor secondary resistance commutating contactors C2L and C1L, respectively, to be successively completed upon movement of master switch MS to the second and third lowering positions as hereinafter described. The aforementioned energization of timing relay TR results in closure of contacts TR2 which close a point in the energizing circuit of contactor CH.

The graph shown in Fig. 5, wherein speeds in terms of percent motor synchronous speed are plotted against percent motor torque (per motor), depicts the operating characteristics of the holding and closing lines and the bucket. Curves 1H, 2H, 3H, and 4H in the upper right-hand portion of Fig. 5 and curves 1L, 2L, 3L and 4L in the lower right-hand portion thereof, representing the effects of the holding and closing lines on the bucket, are similar to the corresponding curves in Fig. 4 hereinbefore described while vertical lines LBW and OBW depict the loaded and open bucket weights, respectively, as aforesaid. Curve 3HA in the upper right-hand portion of Fig. 5 depicts an additional acceleration step provided in Hoist speed point 4 by retarded energization of commutating contactors C4A and H4A through slow-acting contacts of timing relay 4AT as hereinafter described.

Curves H1L, H2L, H3L and H4L in the lower right-hand portion of Fig. 5 depict the speed torque characteristics of the holding lines in the first, second, third and fourth lowering positions, respectively, of the master control system. Curves C1L, C2L and C3L in the lower left-hand portion and curve C4L in the lower right-hand portion of Fig. 5 depict the speed torque characteristics of the closing lines in the first, second, third and fourth lowering positions, respectively, of the master control system. It will be observed as the description proceeds that the lower right-hand quadrant represents lowering motion concurrently with hoisting energization or torque while the lower left-hand quadrant represents lowering motion concurrently with lowering energization or torque.

As a result of the aforementioned energization of the hold motor in the hoisting direction as depicted by curve H1L in Fig. 5 and energization of the close motor in the lowering direction as depicted by curve C1L, the bucket starts lowering along curve 1L. The weight of the open bucket is sufficient to fully load the hold motor when the latter is energized for hoisting as shown by the intersection of bucket weight line OBW with the horizontal zero speed line at 75 percent torque and the intersection of curve H1L with the latter at approximately 70 percent torque, thus to afford the close motor control over movement of the bucket. Close motor CM accelerates in the lowering direction and, being coupled to hold motor HM through clutch CW as aforesaid, drives the hold motor in the lowering direction, increasing the counter-torque provided by the hold motor as shown by curve H1L until counter, hoisting torque portion X counterbalances the lowering torque X′ at approximately 20 percent lowering speed.

When hold motor HM reaches 10 percent of its synchronous speed, the voltage induced in its secondary winding is sufficient to energize operating coil 1VR1 of voltage relay 1VR, Fig. 2. Relay 1VR closes contacts 1VR2, Fig. 3A, to close another point in the aforementioned energizing circuit of contactor CH.

In order to further accelerate lowering of the bucket, master switch MS is moved to Lower operating position 2 to open contacts MS7 and close contacts MS10. Contacts MS7 interrupt the energizing circuit of operating coil H1L1 to release contactor H1L and open contacts H1L2–3 in the hold motor secondary resistance network. As a result, resistor group R3 is reinserted effectively in the network to decrease the hold motor counter, hoisting torque as shown by curve H2L in Fig. 5, thus to enhance acceleration of the bucket in the lowering direction. Contacts MS10 complete the energizing circuit of operating coil C2L1 of contactor C2L through contacts CLR7 and CL7. Contactor C2L closes contacts C2L2–3, Fig. 2, to shunt resistor group R11 effectively out of the close motor secondary resistance network. As a result, close motor CM develops an increased lowering torque as shown by curve C2L to accelerate the bucket along curve 2L, drives hold motor HM in the lowering direction increasing the countertorque as shown by curve H2L until countertorque portion Y counterbalances the lowering torque Y' at approximately 55 percent speed whereat the bucket speed line 2L intersects the open bucket weight line OBW.

Moving master switch MS to Lower operating position 3 results in opening of contacts MS8 and closure of contacts MS11. Contacts MS8 interrupt the energizing circuit of operating coil H2L1 to release contactor H2L and open contacts H2L2-3 in the hold motor secondary resistance network. As a result, resistor group R2 is reinserted effectively in circuit to decrease the hold motor counter, hoisting torque another step as shown by curve H3L in Fig. 5 and permit further acceleration of the bucket. Contacts MS11 complete an energizing circuit for operating coil C1L1 of contactor C1L through contacts CLR8 and CL7 whereupon contacts C1L2-3 close to shunt resistor group R12 effectively out of the close motor secondary resistance network. As a result, close motor CM further increases the lowering torque as shown by curve C3L in Fig. 5 to accelerate the bucket along curve 3L, driving the hold motor reversely and increasing the countertorque as shown by curve H3L until a balanced condition is reached at 100 percent speed as shown by the intersection of curves 3L and H3L with line OBW in Fig. 5.

When hold motor HM is driven to 80 percent of its synchronous speed, the voltage induced in its secondary winding becomes sufficient to energize operating coil 2VR1 of voltage relay 2VR, Fig. 2, whereupon the latter opens contacts 2VR2, Fig. 3A, to prevent reenergization of contactor H1L during subsequent speed checking until the bucket speed has decreased to 80 percent as hereinafter described.

Moving master switch MS to Lower operating position 4 results in closure of contacts MS5 and opening of contacts MS9-11. Contacts MS5 complete an energizing circuit across lines L1-2 for operating coil CLR1 of relay CLR while contacts MS9-11 interrupt the energizing circuits of operating coils H3L1, C2L1 and C1L1, respectively, to release contactors H3L, C2L and C1L. Contacts H3L2-3 open to reinsert resistor group R1 effectively in the hold motor secondary resistance network to decrease the hold motor counter, hoisting torque another step as shown by curve H4L in Fig. 5 and permit further acceleration of the bucket. Contacts C2L2-3 and C1L2-3 open to reinsert resistor groups R11 and R12 effectively in the close motor secondary resistance network for reasons hereinafter described.

Relay CLR being energized as aforesaid opens contacts CLR8 and CLR7 to prevent reenergization of commutating contactors C1L and C2L as the master switch is subsequently moved back through operating position 3 to position 2. Contacts CLR6 close to prepare an energizing circuit for operating coil C2L1 to be subsequently completed upon movement of master switch MS back to Lower operating position 1. Contacts CLR5 open to place contactor H1L under the control of voltage relay 2VR and prevent reenergization of commutating contactor H1L until the bucket speed decreases to 80 percent should the master switch be rapidly moved to its Off position. Contacts CLR4 open to interrupt the energizing circuit of operating coil CL1 while contacts CLR2 close to complete the energizing circuit of operating coil CH1, through contacts MS4, TR2, 1VR2, CLR2, LLR2, SW3 and CL6, the latter contacts CL6 closing in response to deenergization of operating coil CL1. As a result, contactor CL opens contacts CL2-4 and contactor CH closes contacts CH2-4 to reverse the energization of close motor CM from the lowering to the hoisting direction as shown by curve C4L in the lower right-hand quadrant of Fig. 5. Relay CLR also closes contacts CLR3 to complete a holding circuit for its operating coil through contacts MS4, TR2, 1VR2 and CLR2. The closure of contacts CH5 and CH8 of contactor CH maintains the circuits interrupted by contacts CL5 and CL7 of contactor CL. Contacts CH6 close to complete the aforementioned holding circuit for contactor HH, interlocking contacts CH7 open to prevent reenergization of contactor CL, and contacts CH9 close without effect at this time.

Although both the hold motor and close motor are now energized in the hoisting direction, the bucket accelerates in the lowering direction along curve 4L in Fig. 5. The resistance of group R1 which was reinserted in the hold motor secondary network in going from Lower speed point 3 to speed point 4 is of relatively large value, approximately equal to the combined resistances of groups R2 and R3. Thus, reinsertion of resistor group R1 decreases the hold motor counter, hoisting torque a substantial amount Z as shown in Fig. 5 whereas the reversal of energization of the close motor to the hoisting direction with all of its secondary resistance in circuit develops a relatively smaller value of torque Z' opposing lowering of the bucket. The resultant countertorque Z'' opposing lowering of the bucket is less than the bucket weight OBW at 100 percent speed as shown in Fig. 5 so that the bucket accelerates along curve 4L up to approximately 150 to 175 percent motor synchronous speed in actual practice.

As the bucket approaches its lowermost position it is desired to check the speed thereof. This is attained by moving the master switch from the fourth to the third Lower operating position or, in order to stop the bucket, all the way to the first Lower operating position or to Off position.

Movement of master switch MS to the third Lower operating position results in opening of contacts MS5 without effect as relay CLR is maintained energized through contacts CLR2 and CLR3, and closure of contacts MS9-11. Contacts MS10 and MS11 close without effect as contacts CLR7 and CLR8 are open while contacts MS9 complete the energizing circuit of operating coil H3L1 of contactor H3L through contacts DR4, LLR7 and HH8.

The graph in Fig. 6, wherein bucket speeds in terms of percent motor synchronous speed are plotted against percent motor torque (per motor), depicts in the lower right-hand quadrant thereof the bucket speed checking characteristics of the invention. Vertical line OBW depicts the open bucket weight as described in connection with Figs. 4 and 5. Curve C4L depicts the speed torque characteristics of the close motor for Lower operating position 4 and corresponds to the like curve in Fig. 5. The speed torque characteristics of the close motor remain unchanged at curve C4L as the lowering speed is checked by moving master switch MS to Lower operating position 3 and therethrough to position 2. This is attained by virtue of commutating contactors C2L and C1L being maintained deenergized at the then open contacts CLR7 and CLR8, respectively. Curve H4L depicts the speed torque characteristics of the hold motor for Lower operating position 4 and corresponds to the like curve in Fig. 5. Curve H3L depicts the speed torque characteristics of the hold motor for Lower operating position 3, curve H2L for position 2 and curve H1L for operating position 1 and correspond to like curves in Fig. 5. Curve H4L being coincident with curve C1L in addition depicts the speed torque characteristics of the close motor for Lower operating position 1 as hereinafter more fully described.

Contactor H3L being energized as a result of checking bucket speed to speed point 3 as aforementioned closes contacts H3L2-3 to shunt resistor group R1 effectively out of the hold motor secondary resistance network. This shifts the speed torque characteristics of the hold motor from curve H4L to H3L which in combination with close motor curve C4L affords a resultant hoisting torque such that the bucket decelerates along curve SC1, Fig. 6.

Moving master switch MS to Lower operating position 2 effects closure of contacts MS8 to complete the energizing circuit of operating coil H2L1 of contactor H2L through contacts DR3, LLR6 and HH8. As a result, resistor group R2 is shunted effectively out of circuit. This shifts the speed torque characteristics of the hold motor from curve H3L to H2L which in combination with close motor curve C4L affords a resultant countertorque such that the bucket decelerates along curve SC2, Fig. 6.

Moving master switch MS to Lower operating position 1 effects closure of contacts MS7 to complete an energizing circuit for operating coil C2L1 of contactor C2L through contacts DR2, CLR6 and CH8. Contactor C2L closes contacts C2L2-3 to shunt resistor group R11 effectively out of circuit. This shifts the close motor speed torque characteristic from curve C4L to curve C1L coinciding with curve H4L to enhance deceleration of the bucket. Assuming that the speed has decreased to a value below 80 percent resulting in deenergization of voltage relay 2VR in Fig. 2 and closure of contacts 2VR2 in Fig. 3A, contacts MS7 also complete an energizing circuit for operating coil H1L1 of contactor H1L through contacts DR2, 2VR2, LLR5 and HH8. Contactor H1L closes contacts H1L2-3 to shunt resistor group R3 effectively out of circuit. This shifts the speed torque characteristic of the hold motor from curve H2L to H1L to further decelerate the bucket.

Moving master switch MS to the Off position results in opening of contacts MS1, MS2 and MS6. Contacts MS1 interrupt the original energizing circuit of contactor HH but the latter is maintained energized through the aforementioned holding circuit to prevent braking the motors until their speed decreases to a safe value. Contacts MS2 open without effect while contacts MS6 interrupt energization of timing relay TR. Capacitor 30 begins to discharge through resistor 28 and operating coil TR1 to retard opening of contacts TR2.

When the speed decreases to 10 percent, voltage relay 1VR opens contacts 1VR2 to deenergize relay CLR, hoisting contactors CH and HH and brake relays CBR and HBR. Relay CLR opens contacts CLR6 to interrupt energization of contactor C2L to reinsert resistor group R11 effectively in circuit. Contactors CH and HH disconnect power from the motors while contactor HH also opens contacts HH8 to interrupt energization of contactors H1L, H2L and H3L to reinsert resistor groups R1-3 effectively in circuit. Relays CBR and HBR open contacts CBR2 and HBR2, respectively, to interrupt energization of brake windings CB1 and HB1 to set the close and hold motor brakes.

The timing of relay TR is set so that contacts TR2 open approximately one second after opening of contacts 1VR2. This is a safety measure to insure that the motors stop in the event contacts 1VR2 fail to open.

It should be observed that in the event master switch MS is rapidly moved from Lower operating position 4 to operating position 1 or to Off position, sudden deceleration of the bucket is automatically prevented. This is accomplished by voltage relay 2VR maintaining contacts 2VR2 open to delay energization of contactor H1L until the speed decreases to 80 percent. As graphically shown in Fig. 6, the hold motor speed torque characteristic follows curve H2L until the speed decreases to 80 percent and then shifts to curve H1L. Thus, the bucket always decelerates along curve SC1 when checking the speed from the fourth to the third Lower speed point and decelerates along curve SC2 when checking the speed to the second or first speed point or to Off position to afford smooth deceleration. At 80 percent speed, the aforesaid characteristic shifts from curve H2L to H1L to further decelerate the bucket.

In the event master switch MS is rapidly moved from Lower operating position 4 to the Off position and relay 2VR fails to function, sudden braking of the motors is automatically prevented by timing relay TR. When the energizing circuit of timing relay TR is interrupted in the Off position as aforementioned, capacitor 30 begins to discharge through resistor 28 and operating coil TR1 to retard opening of contacts TR2 for a predetermined time interval to permit the bucket to slow down to a safe value. At the end of such time interval contacts TR2 open to initiate braking of the motors as hereinbefore described in connection with release of voltage relay 1VR.

To perform a digging operation in order to fill the bucket with ore or other material being unloaded, DIG switch 34 is pressed and simultaneously master switch MS is moved through Hoist operating positions 1, 2 and 3 to position 4.

Pressing DIG switch 34 completes an energizing circuit for operating coil DR1 of DIG relay DR across lines L1-2. Relay DR opens contacts DR2-5 to prevent energization of contactors H1L, H2L, H3L and HP, closes contacts DR6 to prepare an energizing circuit for contactor C1A, opens contacts DR7 for reasons hereinafter described, and closes contacts DR8 to complete an energizing circuit for operating coil DT1 of timing relay DT through conductor 40. Relay DT closes contacts DT2 to close another point in the energization circuit of contactor C1A and opens contacts DT3 to place contactors C1A, C2A, C3A and C4A under control of DIG switch 34 as hereinafter described.

Movement of master switch MS to Hoist operation position 1 results in closure of contacts MS1, MS3 and MS10-12 while contacts MS7-9 remain closed and opening of contacts MS4. Contacts MS1 complete the above traced energizing circuit for contactor HH which closes contacts HH2-4 to energize hold motor HM in the hoisting direction. Contacts MS3 complete an energizing circuit for operating coil CH1 of contactor CH through contacts LLR2, SW3 and CL6. Contacts MS10-12 close points in the energizing circuits of operating coils C2L1, C1L1 and CP1. Contactor HH also closes contacts HH5 to energize relay HBR which in turn at contacts HBR2 energizes winding HB1 of hold motor brake HB to disengage the latter, closes contacts HH7 to prepare a shunt circuit across contacts MS1, closes contacts HH8 without effect as contacts DR2-4 are open, and closes contacts HH9 to prepare energizing circuits for operating coils HP1, H1A1, H2A1, H3A1 and H4A1. Contactor CH closes contacts CH2-4 to energize close motor CM in the hoisting direction, closes contacts CH5 to energize relay CBR which in turn at contacts CBR2 energizes winding CB1 of close motor brake CB to disengage the latter, closes contacts CH6 to complete the aforementioned shunt circuit across contacts MS1 through contacts HH7 and MS3 to maintain energization of contactor HH, closes contacts CH8 to complete energizing circuits for operating coil C2L1 through contacts CLR7 and MS10 and for operating coil C1L1 through contacts CLR8 and MS11, and closes contacts CH9 to complete the energizing circuit of operating coil CP1 through contacts MS12. Contactors C2L, C1L and CP close respective contact pairs C2L2-3, C1L2-3 and CP2-3 to shunt resistor groups R11-13 effectively out of circuit. Contactor CP also closes contacts CP4 to close a point in the energizing circuit of operating coil C1A1, opens contacts CP5 to prevent energization of relay CCR, and opens contacts CP6 to interrupt the energizing circuit of timing relay 1AT. Capacitor 56 begins to discharge through resistor 54 and operating coil 1AT1, and after a time interval contacts 1AT2 close another point in the energizing circuit of contactor C1A.

Moving master switch MS to Hoist operating positions 2, 3 and 4 results in successive closure of contacts MS13, MS14 and MS15. In Hoist operating position 2 contacts MS1, MS3 and MS7-12 remain closed and contacts MS13 complete the energizing circuit of contactor C1A through contacts DR6, DT2, 1AT2, CP4, operating coil C1A1 and contacts CH9. Contactor C1A closes contacts C1A2-3 to shunt resistor group R14 effectively out of the close motor secondary resistance network. Contactor C1A also closes contacts C1A4 to prepare an energizing circuit for operating coil C2A1 of contactor C2A and opens contacts C1A5 without effect at this time.

In Hoist operating position 3 contacts MS1, MS3 and MS7-13 remain closed and contacts MS14 close while in Hoist operating position 4 contacts MS1, MS3 and MS7-14 remain closed and contacts MS15 close without effect as timing relays 2AT, 3AT and 4AT maintain the energizing circuits of contactors C2A, C3A and C4A open at contacts 2AT2, 3AT2 and 4AT2, respectively.

As a result of the aforementioned operations, resistor groups R15-18 remain effective in the close motor secondary resistance network while resistor groups R1-9 remain effective in the hold motor secondary resistance network. Consequently, the close motor develops a greater torque than the hold motor and the bucket begins to close. As the bucket dips into the pile, it pulls down against a light, stalled, hold motor torque (equal to that developed by the hold motor in Lower speed point 4) to keep the holding lines taut while permitting the bucket to settle.

Should the close motor approach a stalled condition when digging, the DIG switch may be momentarily released to effect hoisting the bucket a desired amount thereby facilitating power closing of the bucket. Release of DIG switch 34 interrupts energization of DIG relay DR which closes contacts DR2-5 to complete the energizing circuits of operating coils H1L1, H2L1, H3L1 and HP1. Relay DR also opens contacts DR6 to interrupt energization of contactor C1A, closes contacts DR7 to prepare a parallel energizing circuit for contactor C1A, and opens contacts DR8 to interrupt energization of timing relay DT. Relay DT opens contacts DT2 to further interrupt the circuit of contactor C1A. Capacitor 52 begins to discharge through resistor 50 and operating coil DT1 and after a time interval contacts DT3 close the aforesaid parallel energizing circuit for contactor C1A. This time interval is sufficiently long to permit deenergization of contactor C1A preparatory to timed acceleration of both the hold and close motors in the hoisting direction. The aforementioned energization of contactors H3L, H2L, H1L and HP results in closure of contacts H3L2-3, H2L2-3, H1L2-3 and HP2-3 to shunt resistor groups R1-4 effectively out of circuit. Contactor HP also closes contacts HP4 to prepare the energizing circuit for contactor H1A, opens contacts HP5 to further interrupt the energizing circuit of clutch control relay CCR, and opens contacts HP6 to open another point in the timing relay 1AT energizing circuit. When contacts DT3 reclose at the end of the aforesaid time interval, contactors C1A and H1A energize and close respective contact pairs C1A2-3 and H1A2-3 to shunt resistor groups R14 and R5 effectively out of circuit. Contacts C1A4 and H1A4 close to prepare energizing circuits for contactors C2A and H2A while contacts C1A5 and H1A5 open to interrupt energization of timing relay 2AT. Capacitor 60 begins to discharge through resistor 58 and operating coil 2AT1 and after a predetermined time interval contacts 2AT2 close the energizing circuits of contactors C2A and H2A which close respective pairs of contacts C2A2-3 and H2A2-3 to shunt resistor groups R15 and R6 effectively out of circuit. Contacts C2A4 and H2A4 close to prepare energizing circuits for contactors C3A and H3A while contacts C2A5 and H2A5 interrupt energization of timing relay 3AT. Capacitor 64 begins to discharge through resistor 62 and operating coil 3AT1 and after a time interval contacts 3AT2 close the energizing circuits of contactors C3A and H3A which close respective pairs of contacts C3A2-3 and H3A2-3 to shunt resistor groups R16 and R7 effectively out of circuit. Contacts C3A4 and H3A4 close to prepare energizing circuits for contactors C4A and H4A while contacts C3A5 and H3A5 interrupt energization of timing relay 4AT. Capacitor 68 begins to discharge through resistor 66 and operating coil 4AT1 and after a time interval contacts 4AT2 close the energizing circuits of contactors C4A and H4A which close respective pairs of contacts C4A2-3 and H4A2-3 to shunt resistor groups R17 and R8 effectively out of the secondary resistance networks.

In actual practice motor secondary resistance commutation may not progress to the extent hereinbefore described as the DIG switch is repressed as soon as the close motor re-accelerates after stalling whereupon the bucket continues digging. When the bucket approaches a closed condition, the DIG switch is released to initiate hoisting of the bucket as hereinbefore described.

If desired, the bucket may be hoisted starting with the master switch in its Off position. Under these conditions, to hoist the loaded bucket, master switch MS is operated through Hoist operating positions 1, 2 and 3 to position 4. Movement of the master switch to position 1 results in energization of hold motor hoisting contactor HH, close motor hoisting contactor CH, hold motor brake relay HBR, close motor brake relay CBR, brake windings HBR and CBR to disengage the motor brakes, hold motor secondary resistance commutating contactors H3L, H2L, H1L and HP, and close motor secondary resistance commutating contactors C2L, C1L and CP, all as hereinbefore described, whereby the control system is set at Hoist speed point 1. As a result, the loaded bucket accelerates in the hoisting direction along curve 1H shown in the upper right-hand portion of Fig. 5 up to approximately 20 percent motor synchronous speed whereat curve 1H intersects the loaded bucket weight line LBW.

Moving master switch MS to Hoist operating position 2 results in energization of secondary resistance commutating contactors H1A and C1A and deenergization of timing relay 2AT as hereinbefore described to accelerate the bucket along curve 2H up to approximately 52 percent rated speed whereat curve 2H intersects line LBW. In Hoist operating position 3 contactors H2A and C2A energize and interrupt energization of timing relay 3AT to accelerate the bucket along curve 3H up to approximately 72 percent speed as shown in Fig. 5. In Hoist operating position 4 contactors H3A and C3A energize and interrupt energization of timing relay 4AT to accelerate the bucket along curve 3HA shown in Fig. 5 up to approximately 83 percent speed. A predetermined time interval after the energizing circuit of relay 4AT is interrupted, contacts 4AT2 close and energize contactors H4A and C4A to further accelerate the bucket along curve 4H up to approximately 90 percent motor synchronous speed.

When the loaded bucket has been hoisted to the desired height, it may be stopped by returning master switch MS to the Off position. As a result the hold and close motors are deenergized and brakes HB and CB are set to hold the bucket. The control contactors and relays are also returned to their initial conditions in preparation for either lowering the loaded bucket or dumping the load. The apparatus for conveying the loaded bucket to the dumping area is omitted herein for the sake of simplicity.

To lower the loaded bucket, Lower Load switch 36 is pressed and master switch MS is set at Lower operating position 1. Pressing switch 36 results in energization of operating coil LLR1 of Lower Load relay LLR which closes contacts LLR3 to prepare an energizing circuit for contactor CH and opens contacts LLR2 to prevent establishment of other maintaining circuits for contactor CH. Relay LLR also opens contacts LLR4-7 to prevent energization of contactors CL, H1L, H2L and H3L and closes contacts LLR8 to prepare an energizing circuit for contactor CP.

Movement of master switch MS to Lower operating position 1 closes contacts MS1 to effect energization of contactor HH to energize the hold motor in the hoisting direction, brake relay HBR and winding HB1 to disengage hold motor brake HB. Closure of contacts MS6 energizes timing relay TR without effect at this time and completes an energizing circuit for operating coil CH1 through contacts LLR3, SW3 and CL6. Contactor CH closes contacts CH2–4 to energize the close motor in the hoisting direction, and closes contacts CH5 to energize relay CBR which in turn closes contacts CBR2 to complete an energizing circuit for winding CB1 to disengage the close motor brake CB. Contactor CH also closes contacts CH6 and opens contacts CH8, without effect at this time, opens contacts CH7 to prevent concurrent energization of contactor CL, and closes contacts CH9 to complete the energizing circuit of operating coil CP1 through contacts LLR8. Contactor CP closes contacts CP2–3 to shut resistor groups R11–13 effectively out of the close motor secondary resistance network. Contactor CP also closes contacts CP4 without effect at this time, opens contacts CP5 to prevent energization of clutch control relay CCR, and opens contacts CP6 to deenergize timing relay 1AT, closing contacts 1AT2 which perform no useful function at this time.

As a result of the aforementioned functions, both the hold motor and the close motor are energized in the hoisting direction, the hold motor having all of its secondary resistance effectively in circuit while resistor groups R11–13 are shunted effectively out of the close motor secondary resistance network. Consequently, the hold motor develops a hoisting torque, of approximately 20 percent (equal to that developed by the hold motor in Lower speed point 4 as shown by the intersection of curve H4L and the horizontal zero-speed line in Fig. 5) while the close motor develops a hoisting torque of approximately 125 percent (equal to that developed by the close motor in Hoist speed point 1 as shown by the intersection of curve 1H and the horizontal zero-speed line in Fig. 5). Let it be assumed that the material weighs the same amount as the open bucket. Then, deducting the aforementioned friction losses, the combined weight of the bucket and material is 150 percent. As the total countertorque amounts to only about 145 percent, the resultant torgue of approximately 5 percent effects lowering of the loaded bucket at a slow speed. The relatively high countertorque of the close motor maintains the bucket closed during lowering.

When the loaded bucket has been lowered to a desired position, Lower Load switch 36 is released and Dump switch 24 is pressed to dump the load. Release of switch 36 results in deenergization of relay LLR which closes contacts LLR2 without effect at this time, opens contacts LLR3 to deenergize contactor CH, and closes contacts LLR4 to complete an energizing circuit for operating coil CL1 of contactor CL through contacts MS6, CLR4, SW4 and CH7, the latter contacts closing upon release of contactor CH. As a result the close motor energization is reversed from the hoisting to the lowering direction.

Pressing Dump switch 24 results in opening of contacts 24a to interrupt energization of contactor HH and opening of contacts 24b to prevent energization of contactor HL. Contactor HH opens contacts HH2–4 to deenergize the hold motor, opens contacts HH5 to deenergize brake relay HBR, and opens contacts HH10 to prevent energization of clutch control relay CCR. Relay HBR opens contacts HBR2 to deenergize winding HB1 to set the hold motor brake.

As a result of the aforementioned functions, the hold motor is braked while the close motor operates in the lowering direction to throw the bucket open.

Selector switch SW is employed to slacken the holding lines to permit removal of a worn hold rope and substitution of another rope in place thereof. This is preferably accomplished when the open bucket has been lowered and is resting on the pile. Operation of selector switch SW results in opening of contacts SW1, SW3 and SW4 and closure of contacts SW2. Contacts SW1, SW3 and SW4 open points in the energizing circuits of power contactors HH, CH and CL, respectively, while contacts SW2 prepare an energizing circuit for power contactor HL. Moving master switch MS to Lower operating position 1 results in closure of contacts MS1–2. Contacts MS2 complete an energizing circuit for operating coil HL1 of hold motor lowering contactor HL through contacts 24b, SW2 and HH6. Contactor HL closes contacts HL2–4 to energize hold motor HM in the lowering direction, closes contacts HL5 to complete an energizing circuit for operating coil HBR1 through contacts MS1 and conductors 26 and 16, and opens interlocking contacts HL6 to prevent concurrent energization of contactor HH. Relay HBR closes contacts HBR2 to complete an energizing circuit for winding HB1 across rectifier bridge RT2 to disengage hold motor brake HB, Fig. 1. Hold motor HM now operates in the lowering direction to slacken the holding lines whereafter master switch MS is returned to its Off position to stop the motor and set brake HB.

Dump switch 24 may also be employed to close the empty bucket in its raised position. Pressing Dump switch 24 results in opening of contacts 24a and 24b to prevent energization of power contactors HH or HL. Moving master switch MS to Hoist operating position 1 results in closure of contacts MS3 to complete an energizing circuit for operating coil CH1 of close motor hoisting contactor CH through contacts LLR2, SW3 and CL6. Contacts MS10–12 also close to prepare energizing circuits for contactors C2L, C1L and CP. Contactor CH closes contacts CH2–4 to energize the close motor in the hoisting direction, closes contacts CH5 to energize relay CBR which in turn at its contacts CBR2 energizes winding CB1 to disengage the close motor brake, closes contacts CH8 to energize contactors C2L and C1L and closes contacts CH9 to energize contactor CP. Contactors C2L, C1L and CP close their contacts to shunt resistor groups R11–13 effectively out of the close motor secondary resistance network. As a result, the hold motor is braked and the close motor operates to close the bucket. Return of master switch MS to Off position stops the close motor.

From the foregoing, it should be apparent that the improved bucket hoist control not only provides for all the required operations but also accomplishes the same in response to manipulation of a single master control so that the resulting motion attained at the bucket is always kept logically in accordance with the direction of movement of the master control. Thus, no complicated or confusing manual operations are required of the operator.

I claim:

1. In a system for operating a two-motor bucket hoist having a holding line motor, a closing line motor, and a selectively engageable clutch means for coupling the motors to one another for matched speed operation, the improvement comprising control means for operating the bucket hoist with a minimum of manual operations, said control means comprising a master switch having an off position and a plurality of hoisting and lowering operating positions, means responsive to setting said master switch to a selected lowering operating position for operating the clutch means to couple the motors for matched speed operation, means also responsive to said setting of said master switch for energizing the motors to afford torques in diverse directions, and means also responsive to setting of said master switch for automatically controlling the torques of the motors to predetermined values, the torques developed by the motors and the weight of the bucket effecting controlled acceleration of the latter in the lowering direction.

2. The invention defined in claim 1 together with means responsive to setting of said master switch to another lowering operating position for reversing the energization of one of said motors and concurrently altering the value of torque developed by the other of said motors to afford acceleration of the bucket above motor synchronous speed.

3. The invention defined in claim 2 together with means responsive to resetting said master switch from said other lowering operating position to the first mentioned lowering operating position for effecting a first step of bucket deceleration, and means responsive to motor speed and effective when such speed decreases to a predetermined value for automatically effecting another step of bucket deceleration thereby to provide gradual deceleration of the bucket.

4. The invention defined in claim 3 wherein the motors are provided with electro-responsive brakes, together with means responsive to motor speed and effective when the latter decreases to another predetermined value for deenergizing said motors and setting said brakes, and timing means responsive to resetting of said master switch in its off position for deenergizing said motors and setting said brakes in the event the last mentioned means fails to operate.

5. In a system for controlling a plurality of motors to lower a load, a master control switch having a plurality of lowering operating positions, means for coupling the motors for operation in unison, means responsive to setting of said control switch at a first operating position for energizing one of said motors for hoisting and another of said motors for lowering and for engageing said coupling means, the countertorque developed by said one motor being insufficient to hoist the load to permit said other motor to accelerate the load in the lowering direction, means responsive to setting of said control switch at a second operating position for decreasing said countertorque and increasing the lowering torque to further accelerate the load to motor synchronous speed while maintaining said coupling means engaged whereby said other motor drives said one motor reversely to afford matched speed operation of the motors, and means responsive to setting of said control switch at a third operating position for reversing energization of said other motor to develop a small amount of countertorque and for decreasing the first mentioned countertorque a greater amount to further accelerate the load above motor synchronous speed.

6. The invention defined in claim 5 together with means responsive to resetting said control switch at said second operating position for increasing the total countertorque to afford deceleration of the load, and means responsive to setting of said control switch to said first operating position for delaying further increase in said total countertorque until the load speed has decreased to a predetermined value to afford smooth deceleration of the load.

7. The combination according to claim 6 together with electro-responsive brakes for the motors effective to engage in response to deenergization of the latter, speed responsive means preventing application of said brakes until the load speed decreases to a predetermined safe value, and means responsive to further resetting of said master switch for effecting time delay engagement of said brakes to insure stopping of said motors if said speed responsive means fails to operate.

8. In an electrical system for controlling the holding and closing line motors of a two-motor bucket hoist having a clutch operable to engage the motors for operation in unison, in combination, a master control system comprising a single drum controller and a control system operable by said drum controller for controlling both the holding and closing line motors and the clutch, said drum controller having a normal position and a plurality of hoisting operating positions for varying the hoisting speed of the bucket and a plurality of lowering operating positions for varying the lowering speed of the bucket, said control system comprising means responsive to setting of said drum controller in selected hoisting operating positions for energizing and adjustably controlling the speeds of both of the motors to hoist the bucket, means responsive to setting of said drum controller in selected lowering operating positions for energizing the holding line motor for hoisting torque to support the bucket and for energizing the closing line motor for lowering torque and for adjustably controlling the torques of both of the motors to lower the bucket, and means responsive in all lowering operating positions of said drum controller for automatically maintaining the bucket open throughout its downward travel and comprising electroresponsive means for controlling the clutch to couple the motors to one another thereby automatically to afford speed matching of the holding and closing lines.

9. The invention defined in claim 8, together with a dig switch, control means responsive to concurrent operation of said dig switch and setting of said drum controller to said hoisting operating positions for controlling the clutch to effect declutching of the motors and for operating the closing line motor to close the bucket and for energizing the holding line motor to maintain the holding lines taut, and control means responsive to restoration of said dig switch to effect acceleration of both motors to hoist the bucket.

10. The invention defined in claim 8, together with a load lowering switch, control means responsive to concurrent operation of said load lowering switch and setting of said drum controller in a lowering operating position for controlling said electroresponsive means to prevent clutching of the motors and for energizing the holding line motor to provide a small countertorque, and control means also responsive to said concurrent operation for energizing the closing line motor to provide a relatively larger countertorque to maintain the bucket closed, the weight of the loaded bucket being greater than the sum of said countertorques to afford lowering of the loaded bucket.

11. The invention defined in claim 8, together with a dump switch, and control means responsive to concurrent operation of said dump switch and setting of said drum controller to a lowering operating position for controlling said electroresponsive means to prevent clutching of the motors and for braking the holding line motor and operating the closing line motor to open the bucket thereby to dump the load.

12. In an electrical system for controlling the holding and closing lines of a two-motor bucket hoist, a drum controller having a central off position and a plurality of hoisting operating positions operable when said controller is rotated in one direction to progressively vary the hoisting speed of the bucket and a plurality of lowering operating positions operable when said controller is rotated in the opposite direction to progressively vary the lowering speed of the bucket, and a control system for the holding line and closing line motors comprising means responsive to setting of said drum controller in selected hoisting operating positions for energizing both the holding line motor and the closing line motor in the hoisting direction and for adjustably controlling the speeds of both of the motors to hoist the bucket, and means responsive to setting of said drum controller in selected lowering operating positions for energizing the holding line motor in the hoisting direction and the closing line motor in the lowering direction and for adjustably controlling the respective hoisting and lowering torques of the motors to lower the bucket.

13. The invention defined in claim 12, together with means responsive to setting of said drum controller in a maximum speed lowering operating position for decreasing the hoisting torque of the holding line motor a substantial amount and for reversing the energization of the closing line motor to the hoisting direction and for controlling the closing line motor to develop a small amount of hoisting torque thereby to afford controlled acceleration of the bucket in the lowering direction.

14. In a system for controlling the holding line and closing line motors of a plural-motor bucket hoist having an electroresponsive clutch which is operable to couple the motors for rotation in unison, control means for the motors comprising a single master switch having a plurality of hoisting operating positions for controlling hoisting of the bucket at a plurality of speed points and a plurality of lowering operating positions for controlling lowering of the bucket at a plurality of speed points, means responsive to setting of said master switch in selected lowering operating positions for energizing the holding line motor for hoisting at a torque substantially sufficient to balance the load, means responsive to setting of said master switch in said lowering operating positions for effecting engagement of the clutch automatically to afford relative control of the holding and closing lines in all lowering speed points, and means responsive to setting of said master switch in said lowering operating positions for energizing the closing line motor for lowering at adjustable torque to maintain the bucket open and to afford controlled speed lowering of the open bucket.

References Cited in the file of this patent

UNITED STATES PATENTS

| | | |
|---|---|---|
| 872,524 | Libby | Dec. 3, 1907 |
| 1,019,500 | Libby | Mar. 5, 1912 |
| 1,175,435 | Gradenwitz | Mar. 14, 1916 |
| 1,252,474 | Miller | Jan. 8, 1918 |
| 2,165,521 | Taylor | July 11, 1939 |
| 2,279,722 | Taylor | Apr. 14, 1942 |
| 2,467,986 | Pell et al. | Apr. 19, 1946 |
| 2,653,283 | Feldhausen | Sept. 22, 1953 |
| 2,671,567 | Reedy | Mar. 9, 1954 |